US010115035B2

(12) United States Patent
Lee et al.

(10) Patent No.: US 10,115,035 B2
(45) Date of Patent: Oct. 30, 2018

(54) VISION SYSTEM AND ANALYTICAL METHOD FOR PLANAR SURFACE SEGMENTATION

(71) Applicants: GM GLOBAL TECHNOLOGY OPERATIONS LLC, Detroit, MI (US); SungKyunKwan University Foundation for Corporate Collaboration, Gyeonggi-Do (KR)

(72) Inventors: Sukhan Lee, Gyeonggi-Do (KR); Hung Huu Nguyen, Gyeonggi-Do (KR); Jaewoong Kim, Seoul (KR); Jianying Shi, Oakland Township, MI (US)

(73) Assignees: SungKyunKwan University Foundation for Corporation Collaboration, Gyeonggi-Do (KR); GM Global Technology Operations LLC, Detroit, MI (US)

( * ) Notice: Subject to any disclaimer, the term of this patent is extended or adjusted under 35 U.S.C. 154(b) by 713 days.

(21) Appl. No.: 14/592,133

(22) Filed: Jan. 8, 2015

(65) Prior Publication Data

US 2016/0203387 A1    Jul. 14, 2016

(51) Int. Cl.
*G06K 9/00*    (2006.01)
*G06K 9/52*    (2006.01)
(Continued)

(52) U.S. Cl.
CPC ............ *G06K 9/52* (2013.01); *G06K 9/00201* (2013.01); *G06T 3/00* (2013.01); *G06T 7/0004* (2013.01);
(Continued)

(58) Field of Classification Search
CPC .. G06K 9/52; G06K 9/00201; G06K 9/00214; G06K 9/46; G06K 9/6209;
(Continued)

(56) References Cited

U.S. PATENT DOCUMENTS 8,326,020 B2    12/2012  Lee et al.
2006/0013505 A1*  1/2006  Yau .................... G06K 9/00201
                                                          382/285

(Continued)

OTHER PUBLICATIONS

Guoliang Xu, "Discrete Laplace-Beltramki Operator on Sphere and Optimal Spherical Triangulations", The Institute of Computational Mathematics, Chinese Academy of Sciences, Beijing, China, 16pps.

*Primary Examiner* — Joseph G Ustaris
*Assistant Examiner* — William Adrovel
(74) *Attorney, Agent, or Firm* — Quinn IP Law (57) ABSTRACT

A vision system is configured to dynamically inspect an object in a field of view. This includes capturing, using a camera, three-dimensional (3D) point cloud data of the field of view and transforming each of the points of the 3D point cloud data into a plurality of tangential surface vectors. Surface normal vectors are determined for each of the points of the 3D point cloud data based upon the plurality of tangential surface vectors. Distribution peaks in the surface normal vectors are detected employing a unit sphere mesh. Parallel planes are separated using the distance distribution peaks. A radially bounded nearest neighbor strategy combined with a process of nearest neighbor searching based upon cell division is executed to segment a planar patch. A planar surface is identified based upon the segmented planar patch.

17 Claims, 5 Drawing Sheets (51) Int. Cl.
| | |
|---|---|
| G06K 9/46 | (2006.01) |
| G06K 9/62 | (2006.01) |
| G06K 9/48 | (2006.01) |
| G06T 3/00 | (2006.01) |
| G06T 7/00 | (2017.01) |
| G06T 7/20 | (2017.01) |
| G06T 7/73 | (2017.01) |
| G06T 7/13 | (2017.01) |
| G06T 7/50 | (2017.01) |
| G06T 7/60 | (2017.01) |
| G06T 7/62 | (2017.01) |
| G06T 7/187 | (2017.01) |
| G06T 7/521 | (2017.01) |
| G06T 7/593 | (2017.01) |
| G06T 15/00 | (2011.01) |
| G06T 17/00 | (2006.01) |
| G06T 17/05 | (2011.01) |
| G06T 17/20 | (2006.01) |
| G01B 11/00 | (2006.01) |
| G01B 11/22 | (2006.01) |
| G01B 11/28 | (2006.01) |
| G01C 11/00 | (2006.01) |
| G01C 11/02 | (2006.01) |
| H04N 13/00 | (2018.01) |

(52) U.S. Cl.
CPC .............. *G06T 7/20* (2013.01); *G06T 7/73* (2017.01); *G01B 11/00* (2013.01); *G01B 11/28* (2013.01); *G01C 11/00* (2013.01); *G01C 11/025* (2013.01); *G06K 9/00214* (2013.01); *G06K 9/46* (2013.01); *G06K 9/6209* (2013.01); *G06K 2009/4666* (2013.01); *G06K 2009/487* (2013.01); *G06T 7/00* (2013.01); *G06T 7/13* (2017.01); *G06T 7/187* (2017.01); *G06T 7/50* (2017.01); *G06T 7/521* (2017.01); *G06T 7/593* (2017.01); *G06T 7/60* (2013.01); *G06T 7/62* (2017.01); *G06T 15/00* (2013.01); *G06T 17/00* (2013.01); *G06T 17/05* (2013.01); *G06T 17/20* (2013.01); *G06T 17/205* (2013.01); *G06T 2200/04* (2013.01); *G06T 2200/08* (2013.01); *G06T 2207/10028* (2013.01); *G06T 2207/20168* (2013.01); *H04N 2013/0081* (2013.01); *H04N 2013/0092* (2013.01)

(58) Field of Classification Search
CPC ...... G06K 2009/4666; G06K 2009/487; G06T 3/00; G06T 7/0004; G06T 7/20; G06T 7/73; G06T 7/00; G06T 7/13; G06T 7/50; G06T 7/60; G06T 7/62; G06T 7/187; G06T 7/521; G06T 7/593; G06T 15/00; G06T 17/00; G06T 17/05; G06T 17/20; G06T 17/205; G06T 2200/04; G06T 2200/08; G06T 2207/10028; G06T 2207/20168; G01B 11/00; G01B 11/22; G01B 11/28; G01C 11/00; G01C 11/025; H04N 13/02; H04N 2013/0092; H04N 2013/0081
See application file for complete search history.

(56) References Cited

U.S. PATENT DOCUMENTS

| | | | | |
|---|---|---|---|---|
| 2006/0017720 | A1* | 1/2006 | Li | G01B 11/2504 345/419 |
| 2006/0114252 | A1* | 6/2006 | Ramani | G06F 17/30277 345/419 |
| 2009/0279807 | A1* | 11/2009 | Kanamorl | G02B 5/3025 382/274 |
| 2009/0290758 | A1* | 11/2009 | Ng-Thow-Hing | G06T 7/73 382/106 |
| 2010/0074473 | A1* | 3/2010 | Kotaba | G06T 7/246 382/106 |
| 2010/0223299 | A1* | 9/2010 | Yun | G06F 17/30277 707/803 |
| 2010/0315412 | A1* | 12/2010 | Sinha | G06T 7/0065 345/419 |
| 2012/0206438 | A1* | 8/2012 | Porikli | G06K 9/00214 345/419 |
| 2012/0306875 | A1 | 12/2012 | Cai et al. | |
| 2013/0124148 | A1* | 5/2013 | Jin | G06F 17/5086 703/1 |
| 2013/0181983 | A1 | 7/2013 | Kitamura et al. | |
| 2013/0321392 | A1* | 12/2013 | van der Merwe | G01C 21/20 345/419 |
| 2013/0342877 | A1 | 12/2013 | Askan | |
| 2014/0192050 | A1* | 7/2014 | Qiu | G06K 9/00214 345/420 |
| 2014/0285625 | A1 | 9/2014 | McGarry | |
| 2015/0286893 | A1* | 10/2015 | Straub | G06K 9/52 382/154 |

\* cited by examiner

VISION SYSTEM AND ANALYTICAL METHOD FOR PLANAR SURFACE SEGMENTATION

TECHNICAL FIELD

The present disclosure relates to machine vision systems.

BACKGROUND

Machine vision systems are employed in manufacturing environments to automatically inspect parts, components, subsystems and other products of manufacture by capturing and analyzing digital images.

SUMMARY

A vision system is configured to dynamically inspect an object in a field of view. This includes capturing, using a camera, three-dimensional (3D) point cloud data of the field of view and transforming each of the points of the 3D point cloud data into a plurality of tangential surface vectors. Surface normal vectors are determined for each of the points of the 3D point cloud data based upon the plurality of tangential surface vectors. Distribution peaks in the surface normal vectors are detected employing a unit sphere mesh. Parallel planes are separated using the distance distribution peaks. A radially bounded nearest neighbor strategy combined with a process of nearest neighbor searching based upon cell division is executed to segment a planar patch. A planar surface is identified based upon the segmented planar patch.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIGS. 5-1, 5-2 and 5-3 graphically show application of a unit sphere mesh to 3D point cloud dataset of a box that has three orthonormal planes, in accordance with the disclosure;

FIG. 6-1 graphically shows a plurality of parallel plane point candidates plotted in relation to an average surface normal vector $\vec{N}$ and a point vector $\vec{Dp}$ from the origin in 3D space, in accordance with the disclosure;

FIG. 6-2 graphically shows a one-dimensional (1D) histogram of the distance distribution projected along one plane surface normal direction based upon the results shown with reference to FIG. 6-1, in accordance with the disclosure;

DETAILED DESCRIPTION

A point cloud is a collection of points that describe a three-dimensional scene in a field of view in context of a three-dimensional (3D) coordinate system, and can represent external surfaces of objects in one embodiment. Point clouds may be used for performing various operations such as, for example, object identification, object classification, scene visualization, segmentation, two-dimensional image data enhancement, and/or other types of operations. The level of performance with which these operations are performed using a point cloud may depend on the resolution of that point cloud. As used herein, the resolution of a point cloud may be the level of detail with which features in the scene captured by the point cloud may be discernible within the point cloud. The resolution of a point cloud may depend on the number of points in the point cloud and/or the point density of the points in one or more portions of the point cloud. As used herein, point density is a measure of the number of points per unit volume. A portion of a point cloud having a higher point density than another portion of the point cloud may be less sparse than the other portion.

Figure 1:
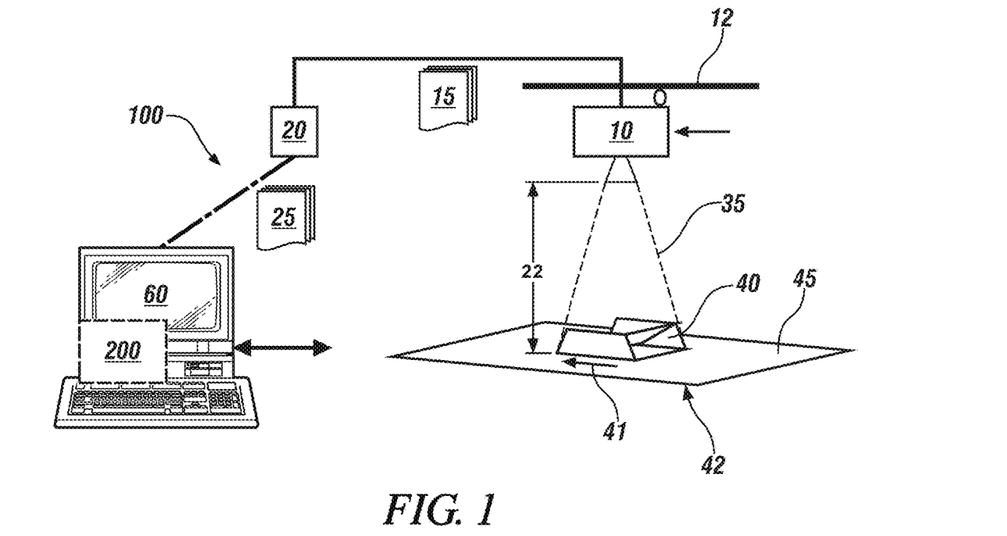
FIG. 1 schematically illustrates an exemplary vision system including an image detector (camera) and an analytic controller, in accordance with the disclosure.

Referring now to the drawings, wherein the depictions are for the purpose of illustrating certain exemplary embodiments only and not for the purpose of limiting the same, FIG. 1 schematically illustrates an exemplary vision system 100 including an image recorder (camera) 10, camera controller 20 and an analytic controller 60.

The camera 10 is preferably a digital image recording device capable of capturing a three-dimensional (3D) image of a field of view (FOV) 35 that is transformed by the camera controller 20 to generate a datafile including a 3D point cloud 25. Alternatively, the camera 10 can include any imaging device that generates a datafile including a 3D point cloud 25 in the FOV 35, a portion of which advantageously represents a physical object 40. As such, the 3D point cloud 25 represents a measured surface of the physical object 40 and can include points in a three dimensional coordinate system (e.g., a set of points defined by x, y, and z coordinates). By way of definition, an image is any visually perceptible depiction representing a field of view. An image may encompass all or a portion of reflected light in the field of view from a visual light spectrum in one embodiment, including a grayscale reflection, a red-green-blue (RGB) reflection, a black-and-white reflection, or any other suitable or desirable reflection. Preferably, an image is captured and recorded in a non-transitory storage medium, such as a non-transitory digital data storage medium.

The camera 10 can be at any position and orientation relative to the FOV 35. In one embodiment, the FOV 35 includes the physical object 40 oriented on a moveable plane 45 that is at a predetermined distance 22 from the camera 10. The object 40 is a structural entity having features including by way of example spatial dimensions, materials and surface finishes indicating reflectivity, among others. In one embodiment, the object 40 can be a component or area on a vehicle in an assembly plant.

In one embodiment, the object 40 oriented on the moveable plane 45 is mounted on a first conveying system 42 that conveys the object 40 in a linear path 41 at a known rate of speed, and the camera 10 is mounted on a second conveying system 12 that conveys them in a corresponding linear path at the known rate of speed for a fixed distance. The linear path 41 in which the object 40 and the camera 10 are conveyed includes the FOV 35.

In one embodiment, the 3D point cloud data 25 are generated by decoding multiple bitmap images 15 in the form of an 8-bit grayscale image with encoded structured light patterns that represents the FOV 35, or color images represented by Hue-Saturation-Intensity (HSI) triplets) or Red, Green, and Blue (RGB) primary colors of the FOV or other image representations without limitation. Other embodiments of the 3D point cloud data can be obtained by a scanning laser or a RGB-D sensor. The camera 10 includes an image acquisition sensor that signally connects to the camera controller 20, which executes digital signal processing (DSP) on the bitmap image file 15 to generate the 3D point cloud 25. The camera controller 20 communicates the 3D point cloud 25 to the analytic controller 60 for processing and analysis as described herein.

The image acquisition sensor captures pixels in the FOV 35 at a predetermined resolution, and generates a bitmap image file 15 the FOV 35, e.g., an 8-bit bit bitmap of the pixels representing the FOV 35 at a predefined resolution. The bitmap image file 15 is communicated to the camera controller 20. The bitmap image file 15 is an encoded datafile stored in a non-transitory digital data storage medium in one embodiment. The bitmap image file 15 includes a digital representation of the image that may include one or a plurality of objects 40 and represents an original image of the FOV 35 captured at the original resolution of the camera 10. The image acquisition sensor of the camera 10 captures the image of the FOV 35 at a nominally standard-definition resolution, e.g., 640×480 pixels. Alternatively, the image acquisition sensor of the camera 10 may capture the image at a nominally high-definition resolution, e.g., 1440×1024 pixels, or at another suitable resolution. The image acquisition sensor of the camera 10 preferably captures the 3D image in the form of one or a plurality of still images.

Controller, control module, module, control, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality, including data storage and data analysis. Software, firmware, programs, instructions, routines, code, algorithms and similar terms mean any controller-executable instruction sets including calibrations and look-up tables.

Figure 2:
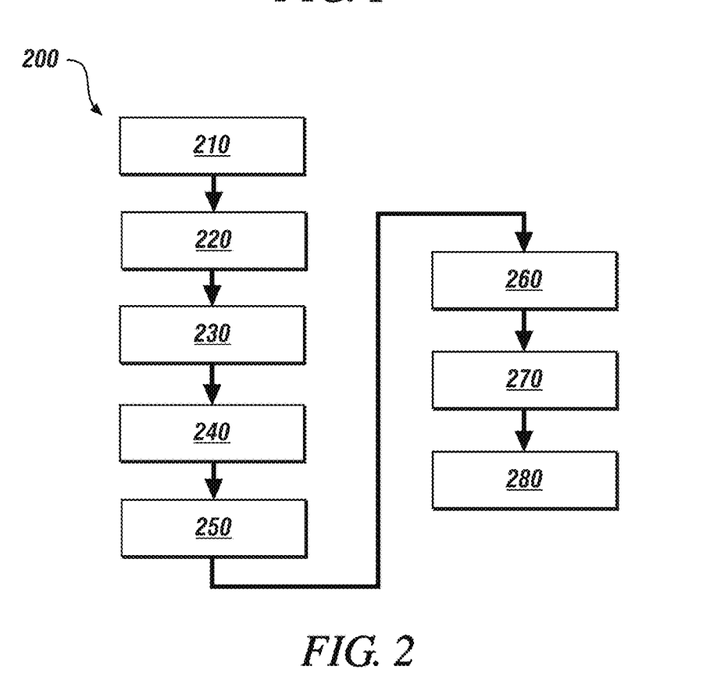
FIG. 2 schematically shows a planar surface segmentation process for segmenting planar surface patches in a scene point cloud generated in a field of view of a digital camera capable of capturing a three-dimensional (3D) image, in accordance with the disclosure.

FIG. 2 schematically shows a planar surface patch segmentation process 200 for segmenting planar surface patches in a 3D point cloud generated in a field of view 35 of a digital camera 10 capable of capturing a three-dimensional (3D) image, employing an embodiment of the vision system 100 described with reference to FIG. 1. The planar surface patch segmentation process 200 is transformed to control routines that are dynamically executable in real-time in the analytic controller 60 or another suitable processing device. Table 1 is provided as a key wherein the numerically labeled blocks and the corresponding functions are set forth as follows, corresponding to the planar surface patch segmentation process 200.

TABLE 1

| BLOCK | BLOCK CONTENTS |
| --- | --- |
| 210 | Capture 3D point cloud data from scene |
| 220 | Transform 3D point cloud into tangential surface vectors |
| 230 | Estimate surface normal vectors from tangential surface vectors |
| 240 | Detect peaks employing unit sphere mesh |
| 250 | Separate parallel planes using the distance distribution peaks |
| 260 | Segment planar patches |
| 270 | Identify planar surface based upon the planar patches |
| 280 | End |

Overall, the planar surface patch segmentation process 200 includes methods and related algorithms for dynamically identifying planar surfaces that includes estimating surface normal vectors for each point by simple computation of vector cross-products and detecting peaks with a pre-computed unit sphere mesh. Parallel planes are separated using distance distribution along a planar normal direction, and planar patches are identified and segmented using a cell division method. The planar surface patch segmentation process 200 and elements thereof preferably periodically execute to identify features of an object from images captured employing an embodiment of the vision system 100. In one embodiment, the planar surface patch segmentation process 200 periodically executes at a rate that is less than 1 second. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. In one embodiment, this includes as follows.

An embodiment of the vision system generates a 3D point cloud 25 from a scene in the FOV (210), and a processor transforms each of the points in the 3D point cloud 25 into a tangential surface vector by taking a differential of two neighboring points for all the points in the 3D point cloud 25 (220). In one embodiment, the 3D point cloud 25 generated by the camera 10 of the vision system 100 produces 3D datasets at a 3D resolution of 0.2 mm of the FOV, and each point corresponds to one pixel in the 3D dataset in one embodiment. The resolution in 3D space is measured by distance. Surface normal vectors are estimated from the tangential surface vectors from step 220 (230). A surface normal vector is a vector that is approximately perpendicular to an implied surface at each point in the 3D point cloud 25. Each point in the 3D point cloud 25 is considered a point of origin having a corresponding surface normal vector.

Figure 3:
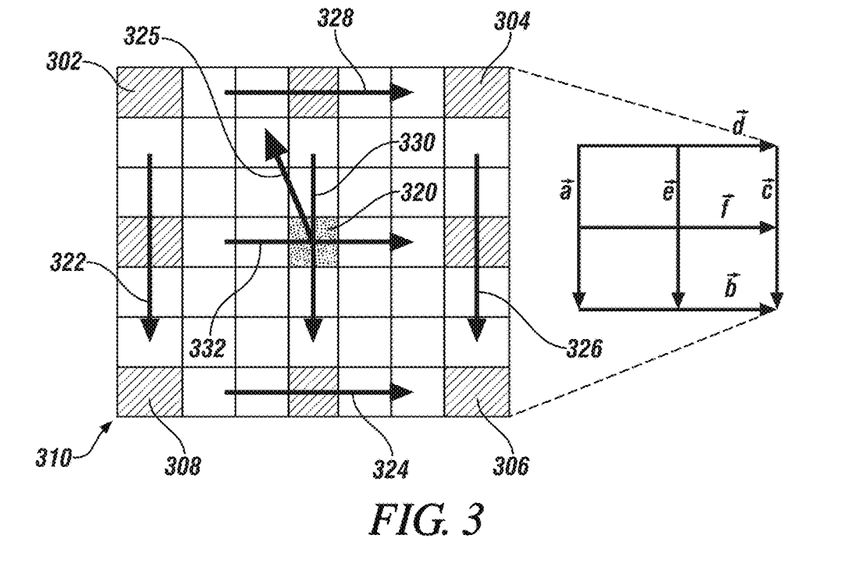
FIG. 3 graphically shows a neighborhood around one point of a 3D point cloud, including a plurality of tangential surface vectors and the estimated surface normal vector, in accordance with the disclosure.

Estimating the surface normal vectors from the tangential surface vectors includes identifying a neighborhood of points around each of the points in the 3D point cloud 25, wherein each of the points represents one point in the 3D point cloud 25. Preferably, the neighborhood of points around each of the points in the 3D point cloud 25 is defined as a 7×7 point surface area. FIG. 3 graphically shows a neighborhood 310 around one point 320 of a 3D point cloud 25, with the 7×7 neighboring points indicated by corner points P1 302, P2 304, P3 306 and P4 308 and associated tangential surface vectors $\vec{a}$ 322, $\vec{b}$ 324, $\vec{c}$ 326, $\vec{d}$ 328, $\vec{e}$ 330 and $\vec{f}$ 332. A surface normal vector $\vec{Np}$ 325 can be calculated for the one point 320 of the 3D point cloud 25 using linear algebra techniques by calculating a cross-product of the vectors, as follows.

$$\vec{Np}(\vec{a}+\vec{c}+\vec{e})\times(\vec{b}+\vec{d}+\vec{f}) \quad [1]$$

In this manner, a surface normal vector can be calculated for each of the points in the 3D point cloud 25. In one embodiment, trade-off between accuracy and calculation time to execute the calculation is minimized with this configuration.

Figure 4:
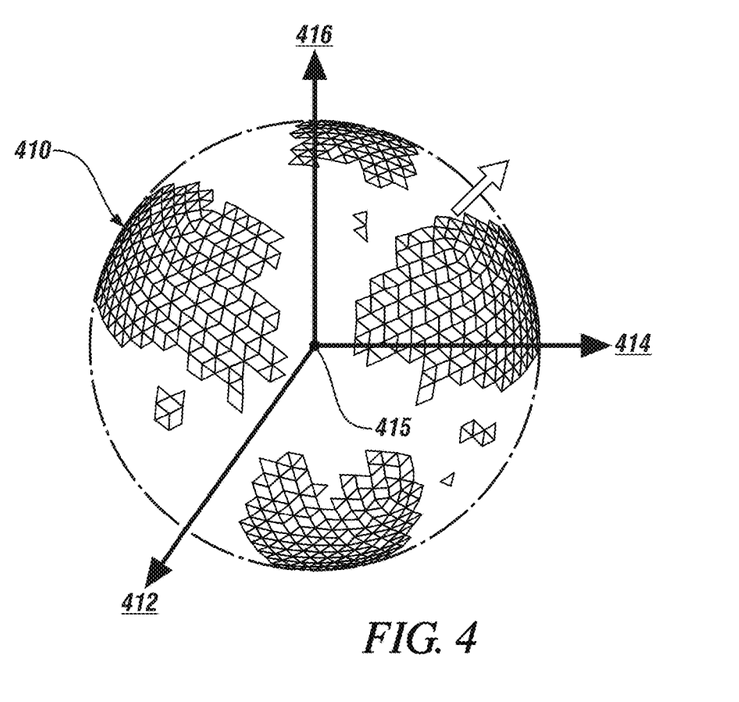
FIG. 4 graphically shows an embodiment of a unit sphere mesh in context of a 3D coordinate system, in accordance with the disclosure.

Referring again to FIG. 2, peaks are detected employing a unit sphere mesh 240) in IJK space, which defines the surface normal space. FIG. 4 graphically shows an embodiment of a unit sphere mesh 410 in context of IJK space, wherein IJK space represents a vector space that defines a 3D coordinate system having origin 415 and axes I 412, J 414 and K 416. The unit sphere mesh 410 graphically depicts a plurality of reference points at the vertices whose neighboring distances are equal. The unit sphere mesh 410 is employed to detect peaks in the IJK space, since peaks with high density highlight the most concentrated surface normal vectors. A Discrete Laplacian-Beltrami (LB) operator is applied on the mesh vertices to detect and identify peaks.

The optimal triangular mesh of spheres used in forming the unit sphere mesh means that the truncation error of the discrete LB operator is the smallest error, and is bounded. The triangular mesh of the sphere can be generated recursively. This includes starting with an icosahedron inscribed in the unit sphere, subdividing recursively each triangle into four triangles by dividing each edge into two at the middle point, and then projecting the middle point to the unit sphere in the normal direction. This process generates a sequence of triangulations that have 20, 80, 320, 1280, 5120, 20480, 81820, ... quantities of triangle facets, respectively. By way of example, a unit sphere mesh with 20480 triangles and 10242 vertices can be advantageously employed for peak detection in the IJK space as a trade-off between computation time and accuracy. For one embodiment of the unit sphere mesh 410, the minimum, maximum and mean angles between two neighboring vertices is 1.98, 2.36 and 2.16 degrees, respectively. Because of computation costs for generating these reference points, the exemplary unit sphere mesh 410 and minimum, maximum and mean angles between two neighboring vertices are preferably saved in a non-transitory memory device and loaded when the planar surface patch segmentation process 200 is executed. The unit sphere mesh 800 graphically shown with reference to FIG. 4 in context of IJK space includes 20480 triangles and 10242 vertices that can be used for peak detection in the IJK space. The unit sphere mesh 410 can be loaded from the non-transitory memory device at run time, with a Discrete Laplacian-Beltrami (LB) operator applied at the mesh vertex locations to identify peaks.

Figure 8:
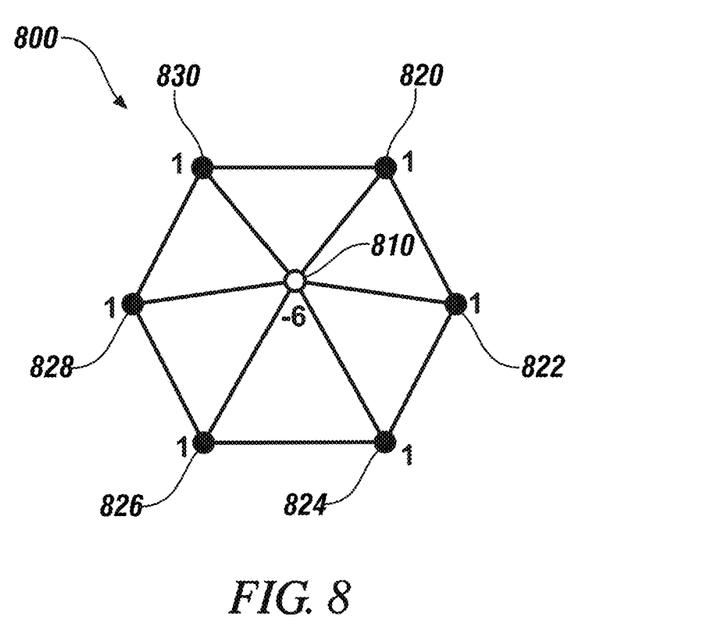
FIG. 8 graphically shows a triangulation mesh that can be applied to a unit sphere mesh, e.g., the unit sphere mesh shown with reference to FIG. 4.
Figure 51:
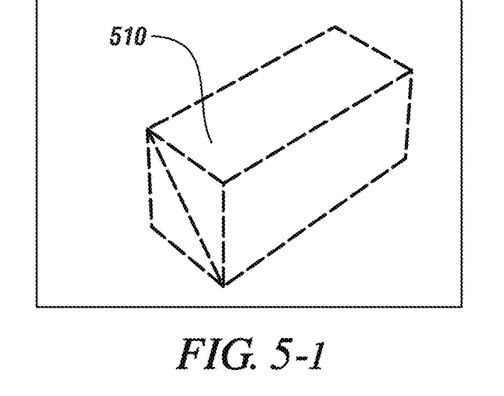
Figure 52:
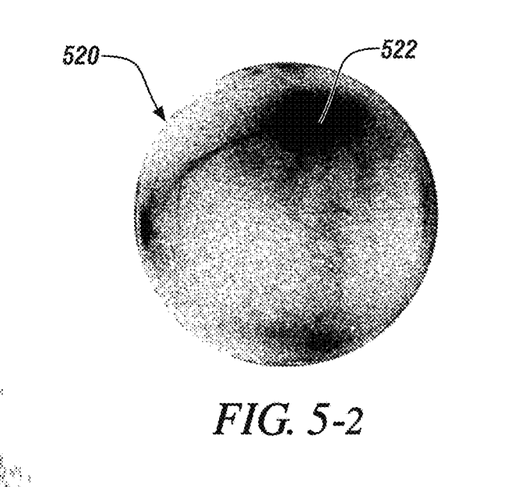
Figure 53:
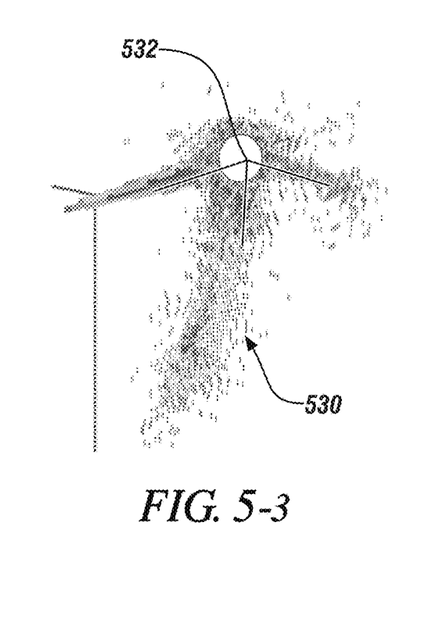

FIG. 8 graphically shows a triangular mesh mask 800 that can be applied to a unit sphere mesh, e.g., the unit sphere mesh 410 shown with reference to FIG. 4 to execute a discrete Laplacian operation. A Laplace operator is a form of a differential operator that can be employed to describe partial differential equations (PDEs) in multi-dimensional Euclidean space. An LB operator forms geometric PDEs such as a mean curvature flow and surface diffusion flow for image processing, surface modeling and computer graphics. A discrete LB operator applied over a surface mesh relates closely to the uniformity of the mesh. As applied to a unit sphere triangulation mesh, each reference point $p_i$ 810 has six neighboring points $p_j$, indicated by elements 820, 822, 824, 826, 828 and 830. The distance between two adjacent ones of the neighbor points is nearly the same for both pairs, allowing the following assumptions:

$\alpha_{ij}=\beta_{ij}$,
$A(p_i)=A(p_j)$ and
$p_ip_j=p_ip_{j-1}=p_ip_{j+1}=p_jp_{j-1}=p_jp_{j+1}$
wherein
$\alpha_{ij}$ is a geometric angle at a vertex between $p_ip_{j-1}$ and $p_jp_{j-1}$,
$\beta_{ij}$ is a geometric angle between $p_ip_{j+1}$ and $p_jp_{j+1}$
$p_j$, $p_{j-1}$ and $p_{j+1}$ are neighboring points, e.g., points 822, 820 and 824, respectively, and
$p_ip_j$, $p_ip_{j-1}$, $p_ip_{j+1}$, $p_jp_{j-1}$ and $p_jp_{j+1}$ are linear distances between the respective points.

Such discretization can be rewritten by the following equation:

$$\Delta_M f(p_i) = \sum_{j \in N(i)} (f(p_j) - f(p_i)) \quad [2]$$

wherein function $f(p_i)$ and $f(p_j)$ represent the number of points belonging to the area around $p_i$ and $p_j$.

A Laplacian value can be computed for all reference points on the unit sphere mesh 410 using a triangular mesh mask 800 having a value of (1,1,1, −6,1,1,1) since each reference point only has 6 neighbors points. The discrete LB operator can be visualized as shown with reference to FIG. 8 wherein reference point $p_i$ 810 has a value of −6 and each of the six neighbor points $p_j$, indicated by elements 820, 822, 824, 826, 828 and 830 has a value of 1. This mask is applied to the unit sphere mesh 410 to approximate second derivatives in a definition of the Laplacian value. Reference points having a negative Laplacian value are considered peak point candidates, and a pre-defined threshold value for the Laplacian value is preferably employed to detect dominant peaks.

FIGS. 5-1, 5-2 and 5-3 graphically show application of a unit sphere mesh to a 3D point cloud data of a box that has three orthonormal planes. FIG. 5-1 graphically shows an isometric view of an embodiment of a 3D box 510 having three orthonormal planes. A 3D point cloud data of the 3D box 510 is captured using the exemplary vision system described with reference to FIG. 1. FIG. 5-2 graphically shows a resulting surface normal distribution 522 of the 3D point cloud data of the 3D box 510 with reference to FIG. 5-1 as captured with a unit sphere mesh 520. FIG. 5-3 graphically shows a portion of the 3D point cloud data of the 3D box 530 including a first peak 532, indicating first plane orientation associated with the resulting surface normal distribution 522 identified in FIG. 5-2.

Referring again to FIG. 2, the outputs from the unit mesh sphere peak detection step (240) include an orientation N(i, j, k) of the planes. Parallel planes are separated (250) using the distance distribution peaks. Separating the parallel planes includes segmenting the planes in the same orientation, wherein the outputs from the unit mesh sphere peak detection step are the orientation N(i, j, k) of the parallel planes. The 3D points belonging to one found peak represent a set of parallel planes having the same normal vector, but these 3D points are at different distances. Distances {D1, D2, ..., Dn} can be computed or otherwise determined for the 3D points P(xn, yn, zn) on a plane with the detected plane surface normal.

Figure 61:
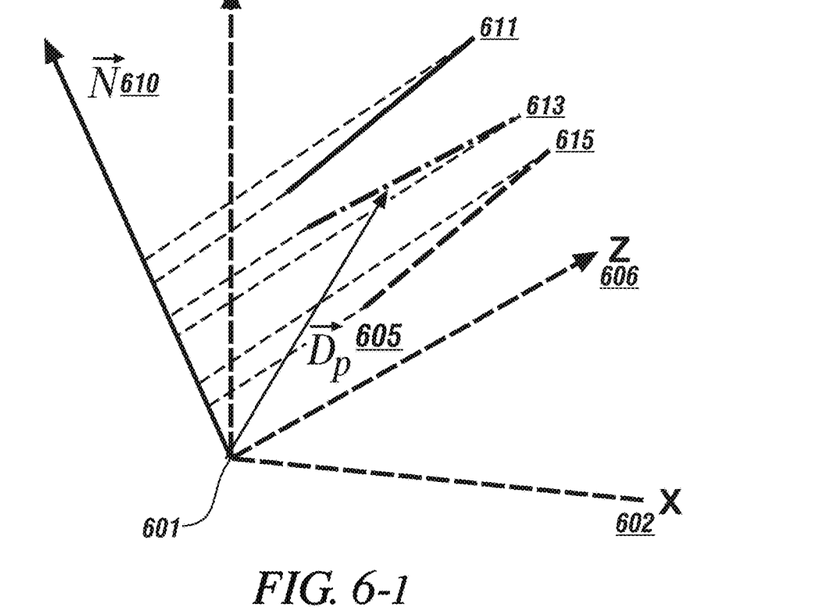

All 3D points that belong to one plane out of several parallel planes can be separated out by their associated distance distribution peaks along an average plane normal vector $\vec{N}$ 610. The plane normal vector $\vec{N}$ 610 is analogous to the surface normal vector that is derived as described in the planar surface patch segmentation process 200. FIG. 6-1 graphically shows a plurality of parallel plane point candidates including Plane 1 611, Plane 2 613 and Plane 3 615 projected onto the average plane normal vector $\vec{N}$ 610 and a distance vector $\vec{Dp}$ 605 in 3D that is defined in context of an x-axis 602, y-axis 604 and z-axis 606 having a point of origin 601 that coincides with an origin of the distance vector $\vec{Dp}$ 605.

Figure 62:
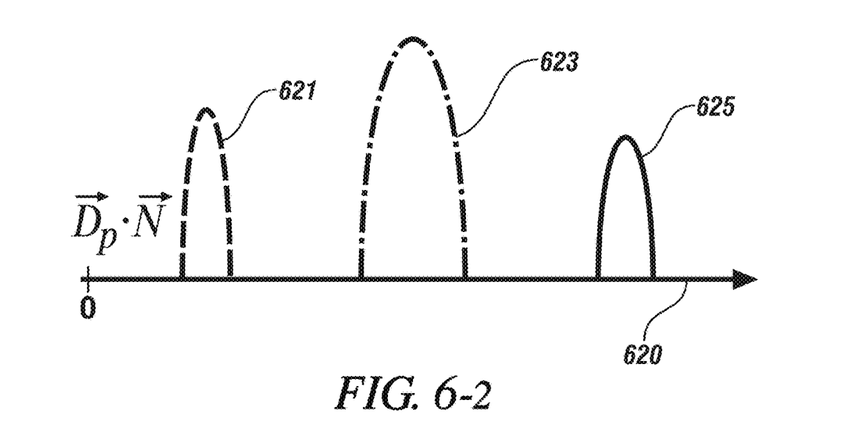

FIG. 6-2 graphically shows a one-dimensional (1D) histogram of the distance distribution of all 3D points for one plane normal vector $\vec{N}$ 610 based upon the results shown with reference to FIG. 6-1. The horizontal axis 620 depicts a distance in the direction of the plane normal vector $\vec{N}$ 610 from the distance distribution density of the distance vector $\vec{Dp}$ 605 and histograms 621, 623 and 625 correspond to the Plane 1 611, Plane 2 613 and Plane 3 615, respectively, shown with reference to FIG. 6-1. The magnitudes of the histograms 621, 623 and 625 are determined based upon $\vec{Dp}*\vec{N}$, i.e., the dot product of the distance vector $\vec{Dp}$ 605 and the average plane normal vector $\vec{N}$ 610. This result provides a distance distribution along the same surface normal direction for all parallel planes. As such, the plane normal direction is employed to calculate a distance distribution. This allows projecting a 3D point into one one-dimension direction, e.g., any 3D point that belongs to Plane 1 611 will be clustered into one peak in one distance dimension along the plane normal vector direction. When two points belong to the same plane, they can be projected into the same peak in the distance dimension. Otherwise they belong to different parallel planes. The projection direction that is parallel to the plane normal vector $\vec{N}$ 610 will be able to differentiate these two parallel planes in the case.

When a distance distribution along the plane normal vector is available, a combined method including simulated annealing and hill climbing can be employed to detect the peaks. Simulated annealing and hill climbing are known analytical techniques for identifying local minimum and maximum peaks, with hill climbing employed in identifying up and down operations, and simulated annealing applied in identifying both local minimum and maximum peaks. These peaks represent parallel plane segments that are employed to identify and segment the data to detect one or more peaks in a distance space.

Referring again to FIG. 2, after the different planes with the same normal vectors at different heights are separated using the distance distribution peaks (250), the planar data is segmented into one or a plurality of patches on the same plane, i.e., segmented into planar patches (260), preferably employing a radially bounded nearest neighbor (RBNN) strategy combined with a process of nearest neighbor searching based upon cell division. RBNN strategies are known, and include assigning point clouds located within a certain radius to a cluster for analysis. The RBNN method is preferably applied with an improvement of nearest neighbor searching based on cell deviation to speed up processing and thus reduce execution time. The RBNN strategy is capable of detecting flat boxes and flat surfaces with high levels of precision. All points on a plane are divided into cells with same size, and each cell represents a set of points. Cells having a quantity of points greater than a predefined threshold are chosen. For all chosen cells, neighbor cells are defined by 3×3 masks. As such, segmenting the planar data into one or a plurality of same planar patches includes transforming all points in each of the planar patches on the same plane to an XOY plane, i.e., the plane perpendicular to its normal direction. A largest rectangle is identified, divided into equal cells, and cells containing at least one point are selected. Clustering is accomplished based upon a rule that two neighboring cells shall have points in the same cluster. This approach can identify arbitrary shapes based on the local density in Eps-neighbor for multiple dimensional data. In one embodiment, it takes 37 milliseconds to process 100,000 points, making this portion of the process suitable for real-time application to identify a planar surface. As described and employed, each neighbor is within a 3×3 matrix. By dividing data into cells and considering cells as points, the number of analyzed points can be reduced by a factor of 40 to 50 while the neighbor searching computation time remains unchanged. A planar surface is identified based upon the planar patches (270), and this iteration ends (280).

The fast planar surface patch segmentation method executes rapidly. The major reduction in computation time is in the step of peak detection using the unit sphere mesh in the IJK space, i.e., step 240. As such, major planar surfaces can be identified employing this method. Thus, real-time automatic visual part inspection can be employed to improve product quality in a manufacturing environment.

Figure 7:
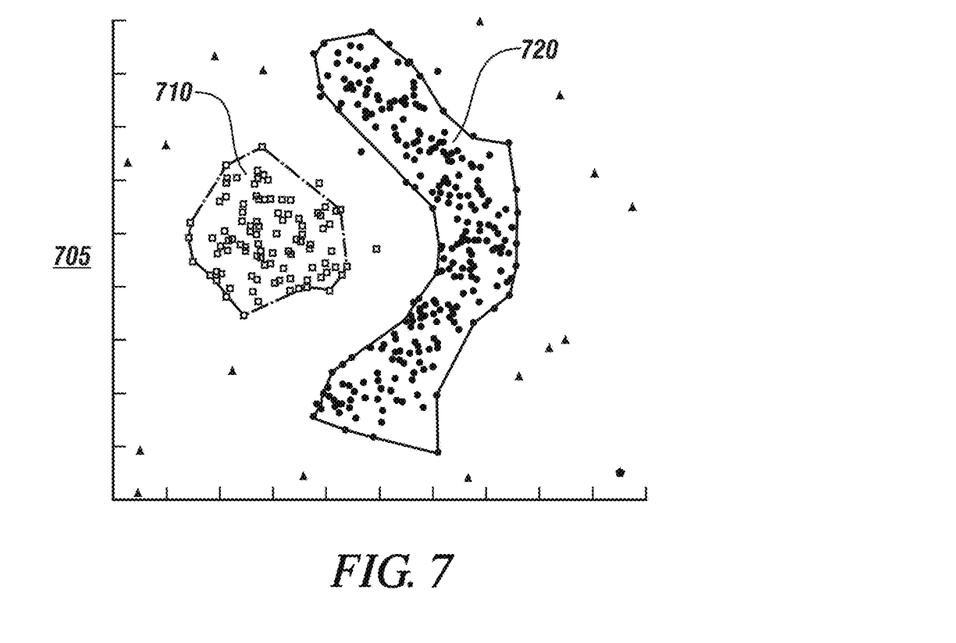
FIG. 7 graphically shows results of executing fast planar surface patch segmentation, which includes transforming all points in each of the patches on the same plane to an XOY plane, in accordance with the disclosure.

FIG. 7 graphically shows results of executing fast planar surface patch segmentation, which includes transforming all points in each of the patches on the same plane to an XOY plane 705, i.e., the plane perpendicular to the normal direction. By projecting the points in a direction that is parallel to the plane normal direction, two patches 710 and 720 can be differentiated, as shown.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for employing a vision system to dynamically inspect an object in a field of view, comprising:
   capturing three-dimensional (3D) point cloud data of the field of view;
   transforming each point of the 3D point cloud data into a plurality of tangential surface vectors;
   determining surface normal vectors for each point of the 3D point cloud data based upon the plurality of tangential surface vectors;
   detecting distribution peaks in the surface normal vectors employing a unit sphere mesh, including inscribing an icosahedron into the unit sphere mesh and recursively subdividing each triangle therein to generate triangulations having a multiplicity of triangle facets and mesh vertices and detecting the distribution peaks based thereon;

separating parallel planes using the detected distribution peaks, wherein separating the parallel planes includes executing, using a controller, a radially bounded nearest neighbor strategy combined with a process of nearest neighbor searching based upon cell division to segment the separated parallel planes in the same orientation into a plurality of planar patches; and identifying a planar surface of the object based upon the segmented planar patches.

2. The method of claim 1, wherein transforming the 3D point cloud data into a plurality of tangential surface vectors comprises taking a differential of two neighboring points to transform each of the points in the 3D point cloud data into a tangential surface vector.

3. The method of claim 1, wherein determining the surface normal vectors for each of the points of the 3D point cloud data based upon the plurality of tangential surface vectors includes:

identifying a neighborhood of points in a surface area around each of the points in the 3D point cloud;

determining a tangential surface vector for each point in the neighborhood of points; and calculating a cross-product of the tangential surface vectors for the neighborhood of points.

4. The method of claim 3, wherein identifying a neighborhood of points in a surface area around each of the points in the 3D point cloud comprises identifying a surface area of 7×7 points for each of the points in the 3D point cloud data.

5. The method of claim 1, wherein determining surface normal vectors for the plurality of tangential surface vectors comprises:

identifying a neighborhood of points around each of the points in the 3D point cloud data;

determining tangential surface vectors associated with the neighborhood of points; and calculating a cross-product of the tangential surface vectors to determine a surface normal vector for each of the points in the 3D point cloud data.

6. The method of claim 1, wherein detecting distribution peaks in the surface normal vectors employing a unit sphere mesh comprises applying a discrete Laplacian-Beltrami (LB) operator on the mesh vertices of the triangles associated with the unit sphere mesh to detect the distribution peaks, including:

identifying reference points on the unit sphere mesh, applying a triangular mesh mask to the unit sphere mesh, wherein the triangular mesh mask approximates a second derivative, and determining peak points on the unit sphere mesh based upon the applying of the triangular mesh mask to unit sphere mesh.

7. The method of claim 1, wherein capturing the 3D point cloud data of the field of view comprises capturing the 3D point cloud data of the field of view using a digital camera.

8. The method of claim 1, wherein separating the parallel planes using the distribution peaks comprises segmenting the parallel planes using the distance distribution along a planar normal direction.

9. A method for dynamically processing a three-dimensional (3D) point cloud associated with a field of view, comprising:

transforming each point of the 3D point cloud into a plurality of tangential surface vectors;

determining surface normal vectors for each point of the 3D point cloud based upon the plurality of tangential surface vectors;

detecting distribution peaks in the surface normal vectors employing a unit sphere mesh, including inscribing an icosahedron into the unit sphere mesh and recursively subdividing each triangle therein to generate triangulations having a multiplicity of triangle facets and mesh vertices and detecting the distribution peaks based thereon;

separating parallel planes using the detected distribution peaks wherein separating the parallel planes includes executing, using a controller, a radially bounded nearest neighbor strategy combined with a process of nearest neighbor searching based upon cell division to segment the separated parallel planes in the same orientation into a plurality of planar patches; and identifying a planar surface based upon the segmented planar patches.

10. The method of claim 9, wherein transforming the 3D point cloud data into a plurality of tangential surface vectors comprises taking a differential of two neighboring points to transform each of the points in the 3D point cloud data into a tangential surface vector.

11. The method of claim 9, wherein determining the surface normal vectors for each of the points of the 3D point cloud data based upon the plurality of tangential surface vectors includes:

identifying a neighborhood of points in a surface area around each of the points in the 3D point cloud;

determining a tangential surface vector for each point in the neighborhood of points; and calculating a cross-product of the tangential surface vectors for the neighborhood of points.

12. The method of claim 11, wherein identifying a neighborhood of points in a surface area around each of the points in the 3D point cloud comprises identifying a surface area of 7×7 points for each of the points in the 3D point cloud data.

13. The method of claim 9, wherein determining surface normal vectors for the plurality of tangential surface vectors comprises:

identifying a neighborhood of points around each of the points in the 3D point cloud data;

determining tangential surface vectors associated with the neighborhood of points; and calculating a cross-product of the tangential surface vectors to determine a surface normal vector for each of the points in the 3D point cloud data.

14. The method of claim 9, wherein detecting distribution peaks in the surface normal vectors employing a unit sphere mesh comprises applying a discrete Laplacian-Beltrami (LB) operator on the mesh vertices of the triangles associated with the unit sphere mesh to detect the distribution peaks, including:

identifying reference points on the unit sphere mesh, applying a triangular mesh mask to the unit sphere mesh, wherein the triangular mesh mask approximates a second derivative, and determining peak points on the unit sphere mesh based upon the applying of the triangular mesh mask to unit sphere mesh.

15. The method of claim 9, wherein capturing the 3D point cloud data of the field of view comprises capturing the 3D point cloud data of the field of view using a digital camera.

16. The method of claim 9, wherein separating parallel planes using the distribution peaks comprises separating parallel planes using the distance distribution along a planar normal direction.

17. A vision system for dynamically inspecting an object in a field of view, comprising:
- a digital camera signally connected to a camera controller signally connected to an analytical controller;
- the digital camera configured to capture a bitmap image file including a three-dimensional (3D) image of the field of view;
- the camera controller executing digital signal processing on the bitmap image file to generate a 3D point cloud; and
- the analytical controller executing a control routine including:
  - transforming each point of the 3D point cloud data into a plurality of tangential surface vectors,
  - determining surface normal vectors for each point of the 3D point cloud data based upon the plurality of tangential surface vectors,
  - detecting distribution peaks in the surface normal vectors employing a unit sphere mesh, including inscribing an icosahedron into the unit sphere mesh and recursively subdividing each triangle therein to generate triangulations having a multiplicity of triangle facets and mesh vertices, including applying a discrete Laplacian-Beltrami (LB) operator on the mesh vertices of the triangles associated with the unit sphere mesh to detect the distribution peaks,
- separating parallel planes using the detected distribution peaks, wherein separating the parallel planes includes executing a radially bounded nearest neighbor strategy combined with a process of nearest neighbor searching based upon cell division to segment the separated parallel planes in the same orientation into a plurality of planar patches; and
- identifying a planar surface of the object based upon the segmented planar patches.

* * * * *